United States Patent
Manera

(10) Patent No.: US 12,285,023 B2
(45) Date of Patent: Apr. 29, 2025

(54) METHOD FOR MANUFACTURING A FOOD PRODUCT COMPRISING MATTER OF DAIRY ORIGIN AND MATTER OF PLANT ORIGIN, AND HYBRID FOOD PRODUCT CONTAINING MATTER OF DAIRY ORIGIN AND MATTER OF PLANT ORIGIN

(71) Applicant: BEL, Suresnes (FR)

(72) Inventor: Rémy Manera, Sainte-Agnes (FR)

(73) Assignee: BEL, Suresnes (FR)

( * ) Notice: Subject to any disclaimer, the term of this patent is extended or adjusted under 35 U.S.C. 154(b) by 346 days.

(21) Appl. No.: 17/763,131

(22) PCT Filed: Sep. 24, 2020

(86) PCT No.: PCT/EP2020/076790
§ 371 (c)(1),
(2) Date: Mar. 23, 2022

(87) PCT Pub. No.: WO2021/058686
PCT Pub. Date: Apr. 1, 2021

(65) Prior Publication Data
US 2022/0272995 A1    Sep. 1, 2022

(30) Foreign Application Priority Data

Sep. 25, 2019 (FR) .................................. 19 10594
Mar. 5, 2020 (FR) .................................. 20 02250

(51) Int. Cl.
*A23C 20/00*    (2006.01)
*A23C 19/08*    (2006.01)
*A23C 19/093*   (2006.01)

(52) U.S. Cl.
CPC ............ *A23C 20/005* (2013.01); *A23C 19/08* (2013.01); *A23C 19/093* (2013.01)

(58) Field of Classification Search
CPC ...... A23C 20/005; A23C 19/08; A23C 19/093
USPC .......................................................... 426/582
See application file for complete search history.

(56) References Cited

U.S. PATENT DOCUMENTS

| 2011/0305740 A1 | 12/2011 | Boursier et al. |
| 2013/0251880 A1* | 9/2013 | Cheneval-Pallud ........................ A23C 19/0925 426/582 |
| 2015/0237885 A1 | 8/2015 | Boursier et al. |

FOREIGN PATENT DOCUMENTS

| FR | 2 949 644 | 3/2011 |
| FR | 2 968 165 | 6/2012 |
| WO | 2016/184856 | 11/2016 |

OTHER PUBLICATIONS

International Search Report dated Nov. 27, 2020, in connection with corresponding International Application No. PCT/EP2020/076790 (7 pp.).

(Continued)

*Primary Examiner* — Brent T O'Hern
(74) *Attorney, Agent, or Firm* — NIXON & VANDERHYE

(57) ABSTRACT

Disclosed is a method for manufacturing a food product including matter of dairy origin and matter of plant origin, including at least 50 wt % of one or more legumes. Also disclosed is a hybrid food product including matter of dairy origin and matter of plant origin, including at least 50 wt % of one or more legumes.

11 Claims, 2 Drawing Sheets

(56) References Cited

OTHER PUBLICATIONS

Written Opinion of the International Searching Authority dated Nov. 27, 2020, in connection with corresponding International Application No. PCT/EP2020/076790 (8 pp.).
French Search Report dated Sep. 9, 2020, in connection with corresponding FR Application No. 2002250, 3 pp.
Anonymous, "Vegetable Balls with Cheese", Mar. 8, 2019, Database accession No./Record ID: 6391031, XP055728328, Mintel, 4 pp., retrieved from URL: www.gnpd.com.
Anonymous, "Cheese and Vegetable Burger", Mar. 8, 2019, Database accession No./Record ID: 6391033, XP055728354, Mintel, 4 pp., retrieved from URL: www.gnpd.com.

* cited by examiner

METHOD FOR MANUFACTURING A FOOD PRODUCT COMPRISING MATTER OF DAIRY ORIGIN AND MATTER OF PLANT ORIGIN, AND HYBRID FOOD PRODUCT CONTAINING MATTER OF DAIRY ORIGIN AND MATTER OF PLANT ORIGIN

BACKGROUND OF THE INVENTION

Field of the Invention

This invention concerns a method for manufacturing a food product comprising matter of dairy origin and matter of plant origin, preferably comprising at least 50 wt % of one or more legumes. This invention also concerns a hybrid food product comprising matter of dairy origin and matter of plant origin, preferably comprising at least 50 wt % of one or more legumes.

Numerous cheese products exist, as do plant products, but there are few examples of hybrid products combining dairy matter and plant matter.

Description of the Related Art

Patent FR2949644 describes a method for manufacturing a cheese product having a dry extract 50%, consisting of a mixture of melted cheese and at least one cereal, as well as a cheese product obtainable by this method. The cheese product is characterised by long shelf-life, i.e. a shelf-life of up to 4 months at room temperature (RT).

Patent FR2968165 describes a method for manufacturing a sweetened dairy product having a dry extract between 30 and 60%, consisting of a base of melted cheese and at least one cereal, as well as a dairy product obtainable by this method. The dairy product is characterised by long shelf-life, i.e. a shelf-life of up to 4 months without refrigeration.

The disadvantage of these prior-art solutions is that the organoleptic properties, in particular the taste, are not optimal, and it may be necessary to add flavours that are inconsistent with the list of ingredients.

Flavourings are additives. Today's consumers are more and more careful about their nutrition, and are increasingly reluctant to consume products containing additives of this type. Customers want 'naturalness'.

Consumers are also tending to reduce the number of animal products included in their diet.

Moreover, cheese products obtained by the methods described in patents FR2949644 and FR2968165 do not have sufficient viscosity to allow for easy packaging in portions, because these cheese products stick to the packaging material, in particular aluminium. Indeed, the products are subject to a dual constraint: Having sufficient melt viscosity for automatic machine packaging, and a texture at low temperature that is sufficiently firm and/or jellified that the product can be extracted from its package.

Manufacturing food products that are easily packaged and have a good shelf life, with reduced dairy content, at high industrial speeds, whilst maintaining good nutritional properties, is a challenge.

SUMMARY OF THE INVENTION

Thus, the objective of this invention is to address the disadvantages of the prior art with a method for manufacturing a food product comprising matter of dairy origin and matter of plant origin and a hybrid food product comprising matter of dairy origin and matter of plant origin.

The food product comprises, relative to the total weight of the product:
a) 20-80 wt % dairy matter; and
b) 10-80 wt % plant matter, preferably comprising at least 50 wt % of one or more legumes.

In one embodiment, the hybrid product comprises, relative to the total weight of the product, 10-80 wt % plant content or matter, of which at least 50 wt %, relative to the plant content/matter, consists of leguminous matter.

In one embodiment, the hybrid food product comprises 20-80% dairy matter and 20-80% plant matter.

The food product further comprises, relative to the total weight of the product:
a) 2-30 wt % added fat, preferably added fat of plant origin;
b) 5-60 wt % water; and
c) 0.1-15 wt % flavouring agents.

In one embodiment, the hybrid food product comprises, relative to the total weight of the product,
a) 20-50 wt % dairy matter, preferably 20-40 wt %; b) 10-50 wt % plant matter, preferably 15-35 wt % plant matter, comprising at least 50 wt % legume(s);
c) 5-20 wt % added fat, preferably added fat of plant origin;
d) 20-50 wt % water; and
e) 0.5-10 wt % flavouring agents.

'Hybrid product' refers to a food product comprising matter of animal origin, e.g. matter of dairy origin, and matter of plant origin, preferably comprising at least 50 wt % of one or more legumes.

The hybrid product according to the invention has a stable emulsion and a jellified texture, allowing for easy packaging without sticking to the packaging material. This is particularly useful in order to package the product in portions, e.g. in aluminium-wrapped portions. The viscosity and texture of the hybrid product are similar to those of a melted cheese conventionally obtained from proteinaceous matter entirely dairy origin, typically comprising 9-14%, in particular 10%, as a function of fat/dry ratio. For a conventional melted cheese, if the quantity of dairy proteins is reduced, e.g. to 7%, the melted cheese will be too liquid and will not be able to be packaged in portions, or it will stick to the packaging material (in particular aluminium) at the time of consumption. To compensate for this loss of viscosity, thickeners such as modified starches may be used. Modified starches are preferred because native starch tends towards retrogradation, resulting in synaeresis of the finished product.

The plant matter, in particular leguminous matter, incorporated into the hybrid product according to the invention contains native starch. Against all odds, the hybrid product according to the invention has a viscosity and a texture similar to those of a conventional melted cheese without any synaeresis due to the retrogradation of the native starch.

The hybrid product according to the invention has a long shelf life. The best-before date of the hybrid products according to the invention is 12 months, preferably 9 months, even more preferably 5 months.

In a first embodiment, the hybrid product forms an entirely homogeneous finished food product, i.e. having the same organoleptic properties throughout its entire mass.

In a second embodiment, several layers of hybrid product having different flavours and/or textures are stacked on top of one another to form a complex finished food product. Without limitation, such a complex product may be obtained by rolling or successive deposition of layers.

In a third embodiment, the hybrid food product comprises an assembly of hybrid food products having different flavours and/or textures, forming a finished food product that is stuffed, wherein a hybrid product surrounds a stuffing consisting of a hybrid product having a different flavour and/or texture. Without limitation, such a stuffed hybrid product could be obtained by extrusion or coextrusion.

The dairy portion (or matter) comprises dairy proteins. It is selected from milk, milk powders, skimmed milk, skimmed milk powder, rehydrated milk, retentates, condensed milks, fermented milk products such as skyr, cheese powders, curds, yoghurts, yoghurt powders, creams, dairy desserts, milk proteins, caseins, caseinates, dairy protein concentrates, dairy protein isolates, serum protein concentrates, serum protein isolates, and/or a mixture of dairy matter.

The cheeses may be pressed-paste cheeses, uncooked pressed-paste cheeses, soft cheeses, blue-veined cheeses, pasta filata, fresh cheeses, ripened cheeses, melted cheeses, melted fresh cheeses, and derivatives thereof, as well as powdered derivatives thereof.

In one embodiment, if the dairy matter comprises melted cheese, it is preferred for the melted cheese not to comprise melting salts and/or additives.

In one embodiment, the dairy matter further comprises dairy proteins in the form of milk powders, cheese powders, yoghurt powders, milk proteins, caseins, caseinates, dairy protein concentrates, dairy protein isolates, serum protein concentrates, serum protein isolates, and/or a mixture thereof.

The plant portion (or matter) comprises plant proteins. The plant matter comprises, relative to the total weight of the plant matter, at least 50 wt %, preferably at least 70, 80, 90, 95 wt % plant matter from one or more legumes, or consists of 100 wt % plant matter from one or more legumes. The leguminous plant matter comprises proteins.

The plant matter is selected from cereals, oilseeds, legumes, tubers, fruits, legumes, mushrooms, algae, microalgae, used alone or in a mixture, and in any form available on the market (powder, liquid, untransformed, raw, mashed, hydrated, cooked and hydrated, precooked, dry cooked, flour, etc.). For example, plant matter comprising at least 50 wt % legumes may comprise—up to a total of 100 wt %—cereals, oilseeds, tubers, fruits, legumes, mushrooms, algae, microalgae, or mixtures thereof.

In one embodiment, the plant matter comprises at least 50 wt % vegetable (in particular leguminous) raw material in cooked and hydrated form, and the rest in another form, e.g. that of flour or powder, optionally hydrated, or of a protein isolate or concentrate. A protein isolate generally contains at least 80% proteins relative to the total weight of the isolate (dry matter); it is commonly obtained by a water extraction method. A protein concentrate generally contains 50-60 wt % protein relative to the total weight of the concentrate; it is commonly obtained by an air separation method.

In one embodiment, the plant matter consists entirely of one or more legumes. In one embodiment, the plant matter consists entirely of vegetable raw material in cooked and hydrated form. In one embodiment, the plant matter consists of vegetable raw material in cooked and hydrated form and protein isolate/concentrate powder.

The plant matter incorporated into the hybrid product comprises native starch.

'Algae' and 'microalgae' refer herein to eukaryotic organisms without roots, stems, and leaves, but with chlorophyll as well as other accessory pigments of oxygen-producing photosynthesis. They are blue, red, yellow, gold, brown, or green.

Strictly speaking, microalgae are microscopic algae. They are single-celled or undifferentiated multi-celled photosynthetic microorganisms that are separated into two polyphyletic groups: eukaryotes and prokaryotes. Living in highly aqueous environments, they may have flagellar mobility. In one embodiment, the plant matter comprises a microalga that is spirulina or chlorella.

'Cereals' refers herein to crops from the grass family that produce edible grains, e.g. wheat, oats, rye, barley, maize, sorghum, and rice. Cereals are commonly ground into flours, but can also be found in grain form, and in some cases, as whole plants (animal feed).

'Tubers' refers herein to all storage organs, generally subterranean, that ensure the survival of plants during the winter and frequently also their vegetative propagation. These organs swell due to the accumulation of stored substances. Organs transformed into tubers include:
  roots: carrots, parsnips, cassava, konjac,
  rhizomes: -potatoes, Jerusalem artichokes, stachys affinis, sweet potatoes,
  stem bases (more precisely: hypocotyls): kohlrabi, celeriac,
  root-hypocotyl assembly: beetroot, radish.

'Oilseeds' refers herein to plants cultivated specifically for their fat-rich seeds or fruits, from which the oil is extracted for food, energy, or industrial use, e.g. soya, colza, peanuts, sunflowers, sesame, and castor.

Within the meaning of this invention, 'legumes' refers to all plants belonging to the caesalpinioideae, mimosaceae, or papilionaceae families, and in particular all plants belonging to the papilionaceae family, e.g. peas, beans, broad beans, lentils, alfalfa, clover, or lupine. This definition includes, inter alia, all plants described in any of the tables contained in R. HOOVER et al., 1991 (HOOVER R. (1991), Composition, structure, functionality and chemical modification of legume starches: a review, Can. J. Physiol. Pharmacol., 69 pp. 79-92)

Legumes are selected, e.g., from the group consisting of peas, alfalfa, clover, lupine, beans, broad beans, lentils, chickpeas, soya, chickpeas, and a mixture of these types of plant matter.

In one embodiment, the plant matter is selected from the group consisting of peas, beans, lentils, chickpeas, and/or a mixture thereof.

Preferably, the legume(s) of the plant matter is/are incorporated, in whole or in part, in the form of grains, preferably in the form of hydrated grains (soaked and dried grains), cooked and hydrated grains, cooked and dried grains (i.e. precooked legumes). The legume(s) of the plant matter may also be incorporated, in whole or in part, in the form of flour or protein isolate/concentrate powder. In one embodiment, the plant matter of leguminous origin is incorporated in the form of a mixture of (i) grains, hydrated grains, cooked and hydrated grains, cooked and dried grains, or flour, and (ii) protein isolate or protein concentrate powder. For example, the leguminous plant matter is incorporated in the form of a mixture comprising (i) 80-90 wt % hydrated grains, cooked and hydrated grains, or cooked and hydrated grains [sic], and (ii) 10-20 wt % protein isolate powder or 15-30 wt % protein concentrate.

The added fat may be of animal or plant origin. Added fat of animal origin is preferably fat of dairy origin, e.g. butter, concentrated butter, cream, anhydrous milkfat, or a mixture thereof. Added fat of plant origin may be selected, inter alia, from soya oil, sunflower oil, palm oil, palm kernel oil, coconut oil, peanut oil, corn oil, cottonseed oil, olive oil, cocoa oil, shea oil, sal oil, mango oil, colza oil, and any vegetable oil used in the manufacture of food products and available on the market, used alone or in mixture. If the added fat is of plant origin, this fat content is not included within the composition of the aforementioned plant content; the matter of which the plant portion/matter consists must contain proteins.

Preferably and without limitation, flavouring agents include spices and aromatics, e.g. from bark, leaves, fruits, bulbs, seeds, nuts, chocolate, tea, coffee, chicory, or aromatic plants or herbs selected, by way of example only, from those commonly used and well known, such as turmeric, paprika, chillies, cinnamon, ginger, saffron, pepper, curry, chillies, mustard, garlic, rosemary, sweet herbs, thyme, or sage, alone or in a mixture.

In one embodiment, the hybrid product comprises no melting salts or texturing agents (gelling or thickening agents), or comprises neither. In another embodiment, the hybrid product comprises at least one melting salt, one texturing agent (gelling or thickening agent), or one melting salt and one texturing agent. In yet another embodiment, the hybrid product comprises no melting salts, but does comprise a texturing agent (gelling or thickening agent), or the hybrid product comprises no texturing agents (gelling or thickening agents), but does comprise a melting salt. Where applicable, the hybrid product contains, relative to the total weight of the hybrid product, no more than 4 wt %, preferably no more than 3.5, 1.5, or 1 wt % melting salts. Where applicable, the hybrid product contains, relative to the total weight of the hybrid product, no more than 3 wt %, preferably no more than 1, 0.5, or 0.2 wt % texturing agents.

In one embodiment of the invention, the hybrid product comprises between 5 and 60 wt %, relative to the weight of the finished product, of added water, preferably between 20 and 50 wt % relative to the weight of the finished product.

The hybrid products comprise between 8 and 21 g of protein per 100 g of finished product. The dairy protein content is between 7 and 14 g per 100 g of finished product. The plant protein content is between 1 and 7 g per 100 g of finished product.

Proteins are contributed by the dairy matter and the plant matter. In one embodiment, the protein content may be completed with dairy proteins, dairy protein concentrates, dairy protein isolates, serum protein concentrates, serum protein isolates, caseins, caseinates, protein concentrates of plant origin, e.g. isolates and/or flours of peas, soya, chickpeas, hemp, rice, lupine, pumpkin, almond, and/or a mixture thereof.

Advantageously, the dry extract of the hybrid food product according to the invention represents 25-60 wt % relative to the finished product.

Advantageously, the dry/fat ratio of the hybrid food product according to the invention represents 20-60 wt % relative to the finished product.

Advantageously, the hybrid food product according to the invention comprises 2-40 wt % fat relative to the finished product.

Advantageously, the hybrid food product according to the invention comprises 1-30 wt % carbohydrates relative to the finished product.

Advantageously, the hybrid food product according to the invention provides 80-500 kcal per 100 g of finished product.

The method for manufacturing a food product comprises the following steps:
a) precooking the raw materials to be included in the composition of the products defined supra at high rotational speeds, e.g. between 500 and 3000 rpm, at a temperature greater than or equal to 65° C. for 1-10 min;
b) cooking at a rotational speed between 500 and 3000 rpm and a temperature greater than or equal to 75° C. for 1-20 min;
c) cooling the mixture to reach a temperature of less than 98° C.;
d) packaging the mixture in one or more portions or in one or more tubs (in the desired volumes).

In particular, the invention also concerns a method for manufacturing a food product comprising:
a) pre-cooking a mixture comprising, relative to the total weight of the mixture, 20-80 wt % dairy matter and 10-80 wt % plant matter comprising at least 50 wt % legume(s), with stirring at a rotational speed of 500 and 3000 rpm and a temperature greater than or equal to 65° C. for 1-10 min;
b) cooking with stirring at a rotational speed between 500 and 3000 rpm and a temperature greater than or equal to 75° C. for 1-20 min;
c) cooling the mixture to reach a temperature of less than 98° C.; and
d) packaging the mixture in one or more portions or in one or more tubs in the desired volumes.

In one embodiment, the mixture further comprises 2-30 wt % added fat, preferably added fat of plant origin, 5-60 wt % water, and 0.1-15 wt % flavouring agents, relative to the total weight of the mixture.

Preferably, the mixture comprises, relative to the total weight of the product:
a) 20-50 wt % dairy matter, preferably 20-40 wt %;
b) 10-50 wt % plant matter, preferably 15-35 wt %;
c) 5-20 wt % added fat, preferably added fat of plant origin;
d) 20-50 wt % water; and
e) 0.5-10 wt % flavouring agents.

The dairy and plant matter, added fat, and flavouring agents are as described supra.

The method is carried out in conventional equipment, such as cutter-type batch cooking devices (e.g. those marketed under the Stephan® brand) or continuous heat treatment devices such as UHT sterilisers, or in devices such as kneaders, mixers, mixer/cookers, co-mixers, or extruders. During precooking, cooking, or each of the precooking and cooking steps, the rotational speed is between 500 and 3000 rpm, preferably 1000-2000 rpm, typically approximately 1500 rpm.

The precooking step is generally preceded by a step of mixing or pre-crushing. Advantageously, this step allows for thorough mixing of the plant matter comprising at least 50 wt % legumes with the dairy matter prior to pre-cooking. This step may also be necessary if the dairy matter comprises one or more pressed-paste cheeses or uncooked pressed-paste cheeses. This mixing or pre-crushing is typically carried out at RT. It is typically carried out at a rotational speed between 500 and 3000 rpm, preferably 1000-2000 rpm, typically approximately 1500 rpm, e.g. for 10 s-2 min, in particular 20 s-1 min.

The cooking temperature is greater than the pre-cooking temperature. For example, the precooking temperature is 65-75° C., preferably 68-72° C. Preferably, the cooking temperature is 75-145° C., preferably 80-140° C., more preferably 100-130° C.

The precooking time is 1-10 min, preferably 1-3 min. The cooking time is 1-20 min, preferably 2-10 min, more preferably 2-6 min.

In one embodiment, a holding step is carried out following the precooking step, following the cooking step, or following each of the precooking/cooking steps. Holding consists of keeping the temperature of the mixture constant, e.g. at the rotational speed of the precooking step if the holding follows the precooking, or, e.g. at the rotational speed of the cooking step if the holding follows the cooking. Thus, during holding, stirring is carried out at a rotational speed of 500 and 3000 rpm, preferably 1000-2000 rpm, typically approximately 1500 rpm. The holding time is typically no more than 2 or 3 min, preferably 1-2 min. Cooking may be carried out:

- in a continuous process at a temperature of 90-145° C. with a holding time of 3-20 s, or
- in a batch process, e.g. in a Stephan cutter cooker, at a temperature of 80-120° C. in a batch process with a cooking time of 2-10 min and a holding time of 0-2 min.

In the cooling step, the temperature is reduced relative to the cooking time, to reach a temperature that is at least less than 98° C. Preferably, cooling is carried out down to the temperature at which the hybrid product is then packaged, e.g. a temperature of 70-98° C., preferably 75-95° C., more preferably between 75 and 90° C.

The finished hybrid product may be packaged in different types of packaging: jars, tubs, flexible pouches, slices, portions, pods, rings, etc. In one embodiment, the hybrid product is packaged in portions, preferably in portions of 4-100 g of hybrid product. In one embodiment, the portions are aluminium-wrapped portions. Alternatively, the portions are wrapped in plastic, paper, or complex material.

In a single package, it is possible to dose products having a homogeneous flavour and texture of various layers of product having different flavour, texture, and/or colour. It also possible to alternate at least one layer of a different hybrid product according to the invention or at least one layer of melted cheese, etc.

Preferably, the product is hot-filled at a temperature in excess of 70° C. for optimal food safety and a shelf-life of more than 3 months, preferably more than 4 months, at RT.

The hybrid product obtained may have various uses: chewed, spread, sucked, or sliced.

DESCRIPTION OF THE PREFERRED EMBODIMENTS

Examples

Figure 1:
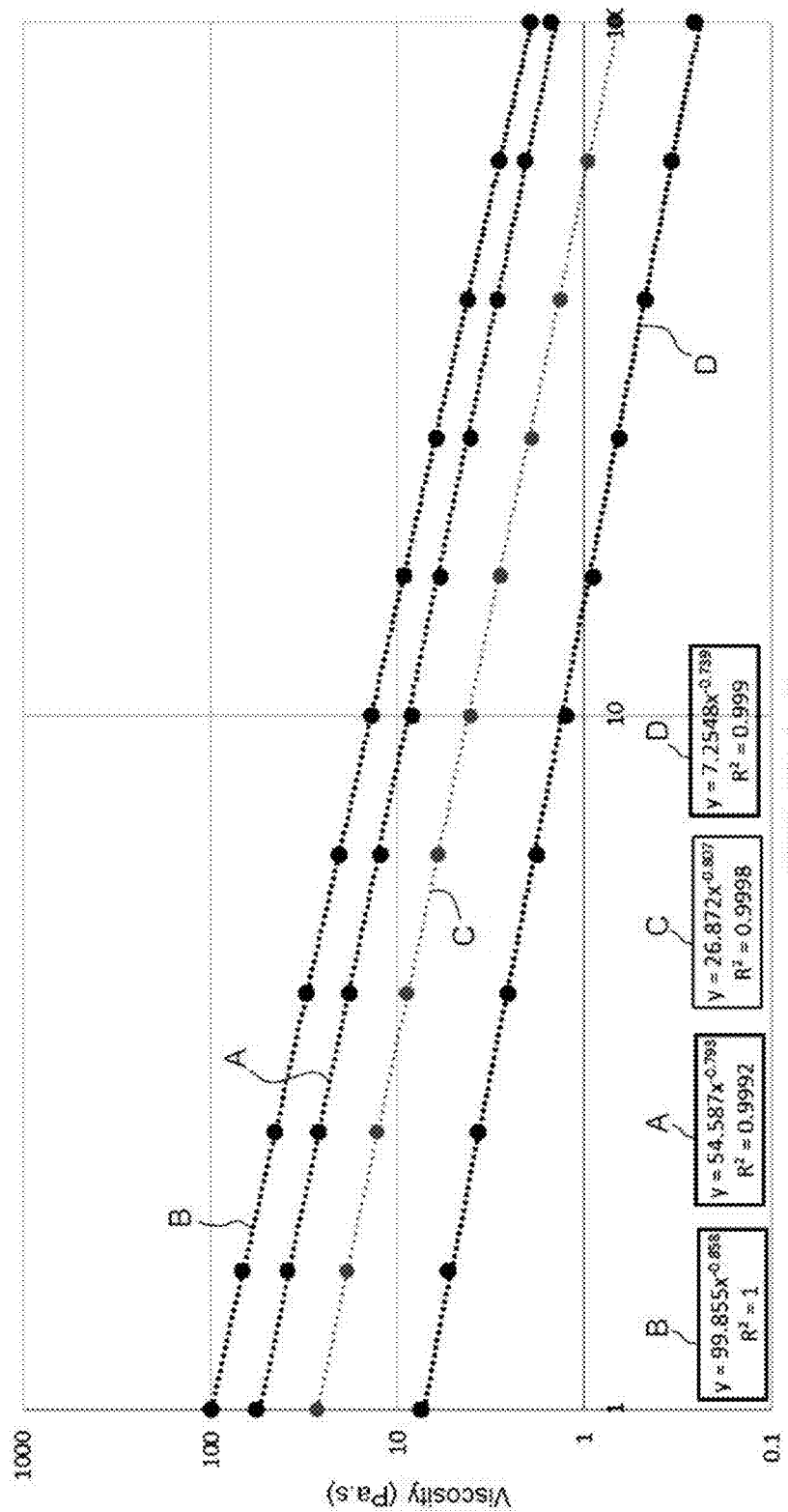
FIG. 1 shows the viscosity of the food products A-D of example 2 at 25° C.

Example 1: Examples of the Composition of a Hybrid Food Product According to the Invention

LENTILS & CURRY

Water, cooked green lentils, cheese, sunflower oil, milk proteins, melting salts (polyphosphates, calcium phosphates), curry, gelling agent: carrageenan, acidifier: citric acid, salt.

CHICKPEAS & HERBS

Water, cooked chickpeas, cheese, sunflower oil, milk proteins, melting salts (polyphosphates, calcium phosphates), parsley, garlic, gelling agent: carrageenan, acidifier: citric acid, salt, cumin.

KIDNEY BEANS & PAPRIKA

Water, cooked kidney beans, cheese, sunflower oil, milk proteins, tomato concentrate, red capsicum, melting salts (polyphosphates, calcium phosphates), spices, gelling agent: Carrageenan, salt, cayenne pepper.

The above exemplary embodiments are based on dairy matter mostly comprising the ingredients of a melted cheese and plant matter mostly comprising legumes.

In an alternative embodiment, the dairy matter mostly comprises melted cheese without melting salts, and the hybrid product obtained comprises no additives, i.e. no texturing agents, flavourings, or preservatives. Such a hybrid product has the advantage of not containing any additives, which makes it more natural.

The nutritional properties of hybrid products according to the foregoing composition examples, are as follows:

TABLE 1

Nutritional properties of hybrid products according to the examples

|  | Chickpeas & herbs | | Lentils & curry | | Kidney beans & paprika | |
| --- | --- | --- | --- | --- | --- | --- |
|  | 100 g | Portion (21 g) | 100 g | Portion (21 g) | 100 g | Portion (21 g) |
| Dry extract (%) | 36.0 | | 36.0 | | 35.5 | |
| Fat/dry (%) | 44.0 | | 44.0 | | 33.5 | |
| Energy (kcal) | 210 | 44.0 | 200 | 42.0 | 181 | 38.0 |
| Fat (g) | 16.0 | 3.5 | 16.0 | 3.5 | 12.0 | 2.5 |
| Saturated fat (g) | 3.0 | 0.5 | 3.0 | 0.5 | 2.5 | 0.5 |
| Carbohydrates (g) | 5.0 | 1.0 | 3.5 | 1.0 | 6.5 | 1.5 |
| Sugar (g) | 0.5 | 0.0 | 0.5 | 0.0 | 3.0 | 0.5 |
| Protein (g) | 11.0 | 2.4 | 10.5 | 2.0 | 11.0 | 2.5 |
| Fibre (g) | 1.5 | 0.5 | 1.0 | 0.0 | 2.0 | 0.5 |
| Sodium (mg) | 750 | 160 | 750 | 160 | 760 | 160 |
| Calcium (mg) | 600 | 120 | 600 | 120 | 600 | 120 |

Due to the dairy matter, products obtained according to this invention are characterised by being rich in calcium relative to 100% plant-based products. The combination of proteins from dairy matter and plant matter allows for products with a good texture and good nutritional properties.

The hybrid products obtained further comprise fibres.

Advantageously, the hybrid products obtained are also low in saturated fatty acids. A low fatty acid content is important in order to protect consumer health, in particular from cardiovascular disease.

The hybrid food products have the advantage of a much lower saturated fatty acid content than conventional melted cheese, which distinguishes them from prior-art solutions. Classically, melted cheese comprises between 60 and 65 wt % saturated fatty acids relative to the total weight of the finished product. The hybrid food product according to the invention, on the other hand, comprises between 5 and 20 wt % saturated fatty acids, preferably between 8 and 15 wt % saturated fatty acids, relative to the total weight of the finished product.

The products are also gluten-free.

The choice of raw materials, in particular for the dairy and plant matter, allows for infinite combinations and a very broad, unlimited range of flavours and textures to be obtained by the manufacturing and packaging method. The hybrid product obtained can be adapted to all consumers and cultures. It is also easy to consume as a snack in the street, at work, or at school, in particular if it is packaged in portions, but it may also be consumed as part of a traditional meal, at home, or in a collective setting, whether it is packaged in portions or tubs, or in any other type of packaging.

Example 2: Effect of Proteinaceous Plant Matter on the Viscosity of the Hybrid Product Four cheese products were prepared according to the same manufacturing method. The composition of the four cheese products and their dry matter and fat characteristics are shown in table 2.

TABLE 2

Composition of the four cheese products and their dry matter and fat characteristics.

| Cheese product | Dry matter (%) | Fat (%) | Dairy proteins (%) | Starch (%) | Chickpeas (%) |
|---|---|---|---|---|---|
| A | 37.4 | 15.37 | 7 | 0 | 25 |
| B |  | 17.6 | 7 | 2 | 0 |
| C |  | 17.6 | 9.6 | 0 | 0 |
| D |  | 19.1 | 7.1 | 0 | 0 |

Cheese product C corresponds to conventional melted cheese, comprising 10% protein, entirely of dairy origin.

Cheese product D is 100% dairy melted cheese having a reduced protein content (7.1%), also entirely of dairy origin.

Cheese product B is a melted cheese having a reduced protein content (7%) entirely of dairy origin, supplemented with a thickening agent (2% starch).

Cheese product A is a hybrid product according to the invention with a reduced dairy protein content (7%) and comprising 25 wt % cooked and hydrated chickpeas. For comparative purposes, cheese product A comprises carrageenans and melting salts, as do cheese products B-D.

It should be noted that the gelling agent (carrageenans) incorporated in the composition of the cheese products does not contribute to the texture of the mixture during the manufacturing process because it is soluble at the dosing temperature. Carrageenans and melting salts are incorporated into the composition of cheese products A, B, and D so as to evaluate only the effect of varying the protein composition.

The detailed composition of ingredients used to prepare the cheese products is described in table 3.

The manufacturing method uses a Stephan cutter and comprises:
Pre-crushing at a rotational speed of 1500 rpm for 30 s;
Precooking at a temperature of 70° C. for 3 min, with a rotational speed of 1500 rpm;
Cooking at a temperature of 110° C. for 3 min, with a rotational speed of 1500 rpm;
Holding for 1 min with a rotational speed of 1500 rpm;
Cooling to a temperature of less than 98° C., if necessary, and dosing.

The texture characteristics of the cheese products are as follows:
Tasting session:
Cheese product A: Normal viscosity and consistency consistent with conventional melted cheese;
Cheese product B: Normal viscosity and consistency consistent with conventional melted cheese;
Cheese product C: Normal viscosity and consistency consistent with conventional melted cheese;
Cheese product D: No consistency, very soft.
Viscosity Measurements:
Viscosity is measured using a Rheolab QC (Anton Paar) at fixed temperature during the measurement: 80 or 25° C. depending on the desired analysis.

Pre-shearing is carried out for 60 s, then the rheology is measured according to a protocol comprising increasing shearing from 1-100 s$^{-1}$, a step of stabilisation at 100 s$^{-1}$, and a step of decreasing shearing from 100-1 s$^{-1}$.

Data mining is carried out using Excel with linear regression of the data points obtained.

Figure 2:
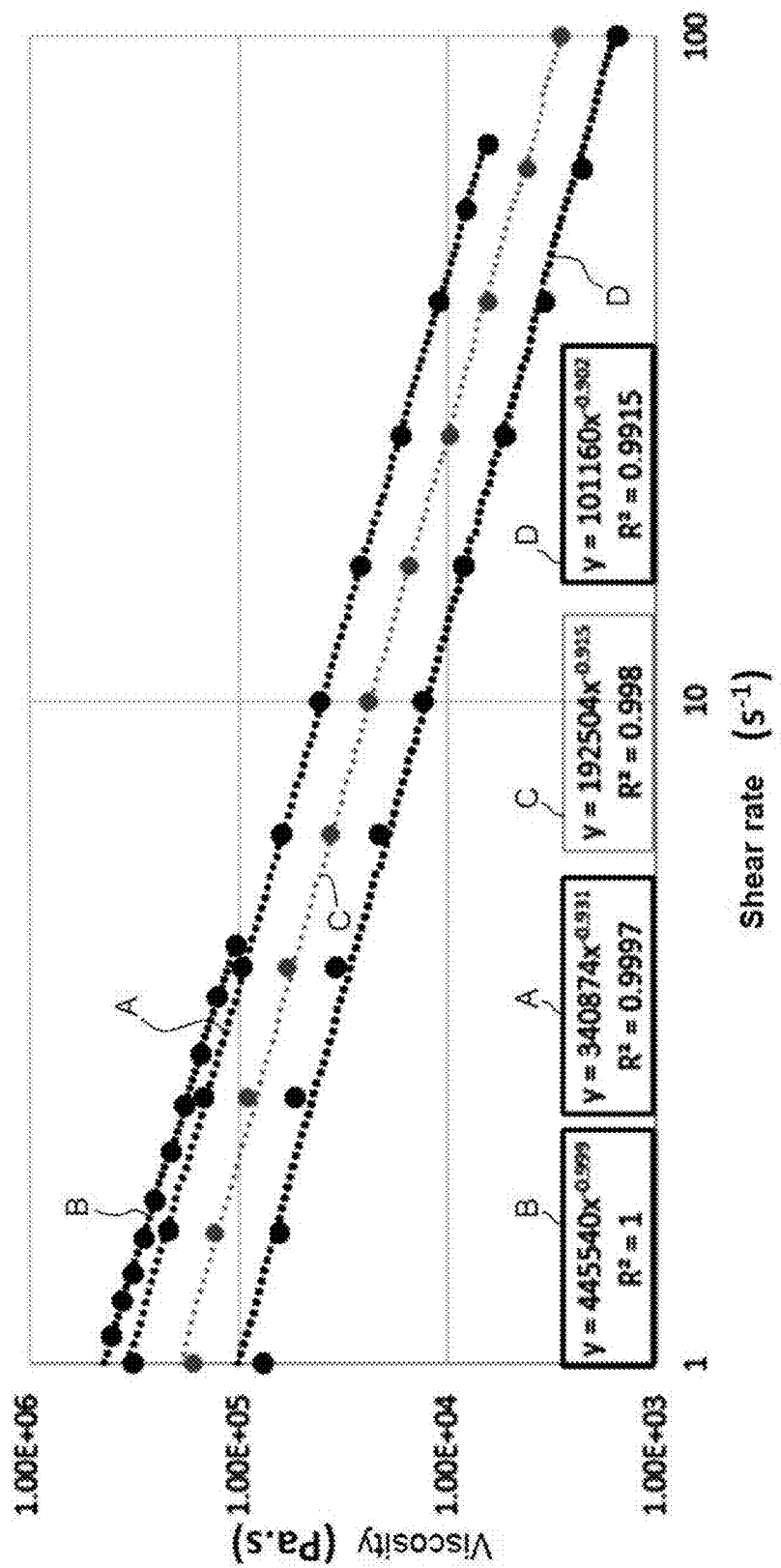
FIG. 2 shows the viscosity of the food products A-D of example 2 at 80° C.

The 25 and 80° C. viscosity measurements (FIG. 1 and FIG. 2) show that the cheese products are ranked as follows in order of increasing viscosity: D<C<A<B.

Texture Analysis:
Penetrometic analysis is carried out using an LFRA Texture analyser (CNS Farhell). The cylindrical probe used has a diameter of 6.35 mm, and descends into the product at a speed of 0.2 mm/s, over a distance of 7 mm, with a threshold value of 0.5 g. The maximum value is retained (peak).

TABLE 4

Texture analysis results for cheese products A-D.

| Cheese product | Texture Analysis |
|---|---|
| A | 29 |
| C | 33 |
| B | 20 |
| D | 8 |

Together, these analyses show that cheese product A, containing the mixture of dairy and plant matter, has characteristics very close to those of conventional melted cheese.

The invention claimed is:
1. Method for manufacturing a food product, comprising:
a) pre-cooking a mixture comprising, relative to a total weight of the mixture, 20-50 wt % dairy matter, 10-50 wt % plant matter comprising at least 50 wt % of one or more legume(s), 5-20 wt % fat, 20-50 wt % water, and 0.5-10 wt % flavouring agents at a rotational speed

TABLE 3

Detailed composition of cheese products A-D.

|  | Product A |  | Product B |  | Product C |  | Product D |  |
|---|---|---|---|---|---|---|---|---|
| Dairy matter | Cheese | 4.13% | Cheese | 10.92% | Cheese | 10.77% | Cheese | 9.33% |
|  | Dairy powders | 11.91% | Dairy powders | 11.68% | Dairy powders | 13.85% | Dairy powders | 12.51% |
| Plant matter | Chickpeas | 25% |  |  |  |  |  |  |
| Plant fat |  | 14.00% |  |  |  | 14.00% |  | 16.00% |
| Thickener |  |  | Modified starch | 2.00% |  |  |  |  |
| Melting salts | Melting salts | 3.09% | Melting salts | 3.35% | Melting salts | 3.20% | Melting salts | 3.35% |
| Gelling agent | carrageenan | 0.10% | carrageenan | 0.10% | carrageenan | 0.10% | carrageenan | 0.10% |
|  | Fine salt | 0.14% | Fine salt | 0.14% | Fine salt | 0.14% | Fine salt | 0.14% |
| Water |  | 41.63% |  | 57.81% |  | 57.93% |  | 58.58% | of 500 and 3000 rpm and a temperature greater than or equal to 65° C. for 1-10 min;
b) cooking at a rotational speed between 500 and 3000 rpm and a temperature greater than or equal to 75° C. for 1-20 min;
c) cooling the mixture to reach a temperature of less than 98° C.; and
d) packaging the mixture in one or more portions or in one or more tubs.

2. The method according to claim 1,
wherein the plant matter comprises at least 70 wt % plant matter from the one or more legume(s), relative to the total weight of the plant matter.

3. The method according to claim 1,
wherein the plant matter of leguminous origin is incorporated in a form of a mixture of (i) grains, hydrated grains, cooked and hydrated grains, or cooked and dried grains, and (ii) protein isolate or protein concentrate powder.

4. The method according to claim 1, wherein the cooking is carried out continuously at a temperature between 9° and 145° C. with a holding time of 3-20 s.

5. The method according to claim 1, wherein the cooking is carried out in batches at a temperature between 8° and 120° C. with a cooking time of 2-10 min and a holding time of 0-2 min.

6. The method of claim 1, wherein the fat is of plant origin.

7. The method of claim 3, wherein the grains comprise at least one of hydrated grains, hydrated and cooked grains, and cooked and dried grains.

8. A food product comprising, relative to a total weight of the product:
a) 20-50 wt % dairy matter;
b) 10-50 wt % plant matter, comprising at least 50 wt % of one or more legume(s);
c) 5-20 wt % fat;
d) 20-50 wt % water; and
e) 0.5-10 wt % flavouring agents.

9. The food product of claim 8, wherein the fat is of plant origin.

10. The food product according to claim 8, wherein the plant matter comprises at least 70 wt % plant matter from the one or more legume(s), relative to the total weight of the plant matter.

11. The food product according to claim 8, wherein the plant matter of leguminous origin is incorporated in a form of a mixture of (i) grains, hydrated grains, cooked and hydrated grains, cooked and dried grains, or flour, and (ii) protein isolate or protein concentrate powder.

* * * * *